UNITED STATES PATENT OFFICE.

FREDERIC PETERSSON, DECEASED, LATE OF BALHAM, ENGLAND, BY ELIAS FREDERICK PETERSSON, ADMINISTRATOR, OF LONDON, ENGLAND, ASSIGNOR TO THE METALS EXTRACTION CORPORATION, LIMITED, OF LONDON, ENGLAND, A BRITISH LIMITED LIABILITY COMPANY.

TREATMENT OF ZINC SOLUTIONS.

1,363,052.  Specification of Letters Patent.  Patented Dec. 21, 1920.

No Drawing.   Application filed July 13, 1920.  Serial No. 395,922.

*To all whom it may concern:*

Be it known that I, ELIAS FREDERICK PETERSSON, a subject of the King of Sweden, residing at London, England, administrator of the estate of FREDERIC PETERSSON, deceased, late of Balham, England, am in possession of certain new and useful Improvements in the Treatment of Zinc Solutions, the invention of the aforesaid FREDERIC PETERSSON, of which the following is a specification.

This invention relates to the treatment of zinc solutions, and has particular reference to the treatment of the solutions obtained in the extraction of zinc-containing materials, such as ores, with acid or acid liquors, from which solutions the zinc may be subsequently deposited electrolytically.

It is common practice to treat zinc ores and other zinc-containing materials with sulfuric acid and thereby to dissolve out a large proportion of the zinc in the form of sulfate, the solution of which, after removal of constituents detrimental to the recovery of zinc by electro-deposition, is electrolyzed for the precipitation of the metal. The zinc ores are usually sulfid ores, and, prior to treatment with the acid, are calcined for the purpose of oxidizing the zinc, *e. g.* for obtaining oxid and sulfate of zinc. In the case of a carbonate ore the preliminary roasting may not be necessary.

In order to extract the zinc, the material may be treated with a solution of sulfuric acid, or with the acid liquors obtained from electrolytic cells, which liquors still contain a small proportion of zinc, the process being carried out by first heating the acid or acid liquor and then adding the zinc-containing material in small quantities at a time until the bulk of the free acid has been neutralized. Completely to neutralize the acid in this way is extremely difficult, and a process for readily effecting the final neutralization of such solutions forms the object of United States Patent No. 1295080. But a further difficulty associated with the treatment of these liquors is that some of the silica which may have been in the original material passes into the soluble condition, and, on cooling or during filtration, may come out in the insoluble or gel form, which offers in almost insurmountable difficulty to filtration. Not only is the filtration of the liquor difficult, but the gelatinous mass retains a considerable quantity of solution and consequently of zinc, and the latter cannot be removed by washing except by the use of large volumes of water, which results in great dilution of the zinc sulfate liquor. By the process of the present invention both neutralization of the liquor and the removal of soluble silica can be economically and readily effected.

According to this invention the process for removing soluble silica from a zinc solution comprises treating the solution (for example the solution obtained by the treatment of zinc ores with acid or acid liquors) with an excess of a neutralizing agent, for example, an alkali earth carbonate, at an elevated temperature. Preferably, the acidity of the solution is neutralized or suitably reduced by addition of the requisite quantity of zinc hydrate or carbonate, or a precipitate containing one of these, prior to adding excess of the agent of the type described. The zinc hydrate or carbonate may be obtained by precipitation of any available zinc solution, such for example as liquors which may be obtained as a by-product in any subsequent operation, and which are thereby usefully turned to account.

The following is an example of one way in which the invention may be carried into effect. A zinc sulfid ore, suitably ground, is calcined in order to oxidize the zinc, for example, to convert the zinc sulfid partly into oxid and partly into sulfate. The calcined and reground product is then added in successive quantities to hot sulfuric acid of from 10 to 15% strength, such for example as the acid liquors obtained from the electrolytic cells from which zinc has been deposited. The addition of roasted ore is continued until the acidity of the liquor has been reduced to about 0.5%. To further neutralize with ore may not be economical, and the neutralization is therefore carried another stage by the addition of a precipitate containing zinc hydrate, zinc carbonate and ferric hydrate obtained from a subsequent stage in the purification of the zinc liquors. The zinc contained in this precipitate is thus recovered. The acidity of the liquor is thereby reduced to about 0.1%. The neutralization is now completed by the addition of ground calcium carbonate, for example, whiting, either dry or mixed to a thin cream with water. At this point any dissolved silica still remains in soluble form, and if the liquor is passed forward for filtration, gelatinization may take place in the filter-presses, or other parts of the plant. A further small amount of whiting is therefore added, say about 20 lbs. per ton of liquor, and the mixture is brought to a temperature of 90° to 100° C. and maintained at this temperature for a short time with agitation. The dissolved silica is completely precipitated in a form which admits of subsequent easy filtration and washing of the residues for the recovery of the zinc.

The quantity of whiting added is that in slight excess of the amount required to bring the solution to neutrality, and it will, of course, be understood that the amount of whiting added after this point of complete neutralization of the free acid has been attained, is only that necessary to effect the separation of the silica in solution, and is insufficient to bring about the precipitation of any appreciable amount of zinc.

It is to be understood that the process may be varied in many ways without departing from the spirit of the invention. Thus in the above example the neutralization of the acid liquors brought to 0.5% acidity could be effected by addition of whiting alone, but this method involves loss of acid from the liquors, and further the process described makes advantageous use of the zinc precipitate in question. A neutralizing agent as herein referred to comprises a substance capable of bringing about the precipitation of the silica under the conditions described, and need not necessarily be employed for neutralizing the acidity of the solution. For example, calcium carbonate might be added to an already neutralized solution. Alternatively to alkali earth carbonates, given as an example of suitable agents of the kind, other substances may be used for the neutralization of the last traces of acid and for the subsequent precipitation of the silica. The use of one of these, viz. zinc hydrate prepared by the addition of milk of lime to zinc solutions, such for example as the weak zinc sulfate liquors obtained by washing out the residues with water, for the neutralization of the last traces of acid has been described in the United States Patent No. 1295080, and may now be used in excess for the purpose of the present process.

Subsequent to the process herein described the zinc sulfate liquors are purified from such impurities as introduce difficulties in the final process of electro-deposition of zinc, and the zinc, thus recovered by electrolysis, is of a high order of purity.

What I claim as my invention and desire to secure by Letters Patent is:—

1. In the process of preparing zinc solutions for electrolysis the herein described method of removing soluble silica therefrom which consists in treating the solution with an excess of a basic neutralizing agent at a temperature near the boiling point of water.

2. In the process of preparing zinc solutions for electrolysis the herein described method of removing soluble silica therefrom which consists in treating the solution with an excess of an alkali earth carbonate at a temperature of 90° C. to 100° C.

3. The herein described process of preparing zinc solutions for electrolysis which consists in treating roasted zinc ores with acid liquor, reducing the acidity of the solution by adding a basic zinc salt, and thereafter adding to the solution an excess of a basic neutralizing agent at a temperature near the boiling point of water.

4. The herein described process of preparing zinc solutions for electrolysis which consists in treating roasted zinc ores with acid liquor, reducing the acidity of the solution by adding a basic zinc salt obtained by precipitation from dilute waste zinc liquors, thereafter adding to the solution an excess of an alkali earth carbonate and agitating the mixture at a temperature of 90° C. to 100° C.

In testimony whereof I affix my signature.

ELIAS FREDERICK PETERSSON,
*Administrator of Frederic Petersson, deceased.*